(12) United States Patent
Romero et al.

(10) Patent No.: US 10,922,909 B2
(45) Date of Patent: Feb. 16, 2021

(54) COMPUTER-IMPLEMENTED SYSTEMS AND METHODS FOR SECURE ENCLOSURES AND ACCESS THERETO

(71) Applicants: Alberto Romero, York, PA (US); Michael Watroba, York, PA (US)

(72) Inventors: Alberto Romero, York, PA (US); Michael Watroba, York, PA (US)

( * ) Notice: Subject to any disclaimer, the term of this patent is extended or adjusted under 35 U.S.C. 154(b) by 0 days.

(21) Appl. No.: 16/211,686

(22) Filed: Dec. 6, 2018

(65) Prior Publication Data

US 2019/0122463 A1 Apr. 25, 2019

Related U.S. Application Data

(63) Continuation-in-part of application No. 15/633,997, filed on Jun. 27, 2017, now Pat. No. 10,176,652.

(Continued)

(51) Int. Cl.
*G07C 9/00* (2020.01)
*G05B 19/042* (2006.01)
*G06K 7/14* (2006.01)
*G05B 9/02* (2006.01)
*G07C 9/22* (2020.01)

(52) U.S. Cl.
CPC .......... *G07C 9/00182* (2013.01); *G05B 9/02* (2013.01); *G05B 19/042* (2013.01); *G06K 7/1413* (2013.01); *G07C 9/00571* (2013.01); *G07C 9/00896* (2013.01); *G07C 9/22* (2020.01); *G05B 2219/23026* (2013.01); *G05B 2219/2648* (2013.01); *G05B 2219/36371* (2013.01); *G07C 2009/00793* (2013.01)

(58) Field of Classification Search
None
See application file for complete search history.

(56) References Cited

U.S. PATENT DOCUMENTS 6,186,358 B1 * 2/2001 Peteraf .................. G07F 11/60
221/155
6,791,450 B2 * 9/2004 Gokcebay .............. G06Q 40/04
235/375

(Continued)

*Primary Examiner* — K. Wong

(57) ABSTRACT

A secure lockable enclosure having a compartment therein, includes an electronically-actuated latching mechanism coupled to a door; a network interface; a sensor for sensing a characteristic related to a user attempting to gain access to the compartment; an environmental controller for heating and/or cooling the compartment; and a processor. The processor being adapted to (i) cause the network interface to transmit information indicative of a sensed characteristic of a user attempting to gain access to the compartment and capable of processing an unlock signal, and (ii) control the environmental controller based on a characteristic of an item placed in the compartment. An exemplary method controlling access by a user to the enclosure includes the steps of receiving identification information of the user from sensors associated with the enclosure; receiving identification information of an account holder; verifying the received identification information of the user against the account holder information and providing an unlock code to the lock device if the identification information of the user and account holder matches.

27 Claims, 8 Drawing Sheets

Related U.S. Application Data

(60) Provisional application No. 62/355,413, filed on Jun. 28, 2016.

(56) References Cited

U.S. PATENT DOCUMENTS

| | | | | |
|---|---|---|---|---|
| 6,882,269 B2* | 4/2005 | Moreno | ............... | A47G 29/141 |
| | | | | 235/383 |
| 7,630,864 B2* | 12/2009 | Shoenfeld | ............... | E05B 65/52 |
| | | | | 702/177 |
| 8,502,645 B2* | 8/2013 | Thomas | ................ | F25D 29/00 |
| | | | | 340/10.1 |
| 8,935,934 B2* | 1/2015 | Barakat | ................ | F25D 31/006 |
| | | | | 414/222.02 |
| 9,223,315 B2* | 12/2015 | Irwin | ....................... | G05D 3/00 |
| 2015/0186840 A1* | 7/2015 | Torres | ................... | A47B 81/00 |
| | | | | 705/339 |

* cited by examiner

COMPUTER-IMPLEMENTED SYSTEMS AND METHODS FOR SECURE ENCLOSURES AND ACCESS THERETO

CROSS-REFERENCE TO RELATED APPLICATIONS

This is a continuation-in-part patent application related to and claiming priority of U.S. patent application Ser. No. 15/633,997, filed: Jun. 27, 2017, which claims priority to U.S. Patent Application Ser. No. 62/355,413, filed: Jun. 28, 2016, both of which are entitled "Computer-Implemented System and Method For Real Estate Property Showing," and incorporated by reference herein in their entirety.

FIELD OF THE INVENTION

This patent specification relates to the field of providing secure controllable access to enclosures and structures for delivering and/or retrieving items placed therein. More specifically, this patent specification relates to systems and methods for providing such controllable access to such enclosures and structures.

All documents cited to or relied upon below are expressly incorporated herein by reference.

BACKGROUND

The need for a secure temperature-controlled enclosure arises out of the problem of having to meet a delivery person at your property and timing a delivery to have food or perishables at the correct temperature. For example, when food is typically ordered the ordering recipient either have to be at the property or time arrival so she/he can have the ordered food at the safe and correct temperature; hot or cold. Disadvantageously, prior art delivery services offer little or no way for the ordering of food or perishable items to be delivered and maintained at a desired temperature at the delivery location if no one is present at such location to receive such food or perishable items.

Deliveries to properties and businesses have been typically made in the same way for decades since the inception of package deliveries. Such deliveries were made by conventional courier services, such as UPS, USPS, and FEDEX, which deliver items and packages to a home or property by handing the end consumer their package when they are present, or if the end consumer is not at the property or business these packages are usually left at the front door of the property causing the package to be vulnerable to theft or damage. Furthermore, food delivered in such manner could create additional complications with food safety.

Additionally, newer delivery companies including Grub Hub, Instacart, Panera, Starbucks, and Uber Eats, deliver cooked food items from multiple restaurants and eateries. Grocery stores have also been delivering perishables to homes and businesses on demand, which adds an additional element of risk due to foodborne illnesses caused by temperature variances from the environment that can taint the food relatively quickly.

Therefore, a need exists for systems and methods for managing access to and controlling temperatures of secure temperature-controlled enclosures. A further need exists for systems and methods for access to and management of a secure temperature-controlled enclosure that are configured to prevent theft of items placed therein. Finally, a need exists for systems and methods for managing access to and controlling temperatures of a secure temperature-controlled enclosures at businesses which allow consumers to receive pre-order perishable items or meals to go from secure temperature-controlled enclosures at such businesses without human supervision for consumer or courier retrieval of such orders.

BRIEF SUMMARY OF THE INVENTION

The invention provides convenience and safety for the delivery or retrieval of food and other perishable items to/from consumers' homes or businesses, whether or not individuals are present to receive or provide such items. The invention is directed to a temperature-controlled and secure lockable enclosure and computer-implemented methods for providing access to such enclosures by authorized persons, such as delivery or courier users for delivering food or perishables to a home, or a customer picking up ordered food or perishables at a business.

According to exemplary embodiment consistent with the principles of the invention, an improved secure enclosure having a compartment formed therein, such as, but not limited to, lockable enclosures or structures, shipping containers, trunks, boxes, lockers, comprises a moveable element, such as a door; an electronically-actuated latching mechanism coupled to the moveable element; a network interface for providing communication with a communications network; a sensor for sensing a characteristic related to a user attempting to gain access to the enclosure compartment; an environmental controller comprising at least one of heating or cooling source adapted to provide at least one of heating or cooling to the at least one compartment, and a processor coupled to the latching mechanism, the network interface, the sensor and the environmental controller. In such exemplary embodiment, the processor is adapted to cause the network interface to transmit information indicative of a sensed characteristic related to the user attempting to gain access to the compartment and capable of processing an unlock signal to control the latching mechanism to provide access to the compartment by the user, and the processor is further adapted to control the environmental controller based on a characteristic of an item placed in the compartment.

The exemplary secure enclosure may further include some level of insulation and the environmental controller may comprise heating and/or cooling element(s), such as heat coil or thermoelectric refrigeration system.

An exemplary computer-implemented method consistent with the principles of the invention for providing access to a secure enclosure includes receiving information representing identification information of a user attempting to gain access to the secure enclosure sensed by a sensor associated with a remotely-controllable electronic lock device of the secure enclosure; processing the sensed information to obtain information indicative of the user; receiving information of an account holder, the information including identification information indicative of the account holder; verifying the processed user information relative to the account holder identification information; transmitting an unlock code to a lock control system associated with the remotely-controllable electronic lock device if the verification step verifies that the processed user information corresponds to the received account holder identification information; and receiving a signal from the secure enclosure system indicative that the system detected that at least one item has been placed into the compartment of the secure enclosure after transmission of the unlock code. The exemplary method further including the steps of receiving information indicative of a characteristic of the at least one item placed in the secure enclosure such as, for example, item type, or specified temperature, e.g., heating or cooling for such item.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
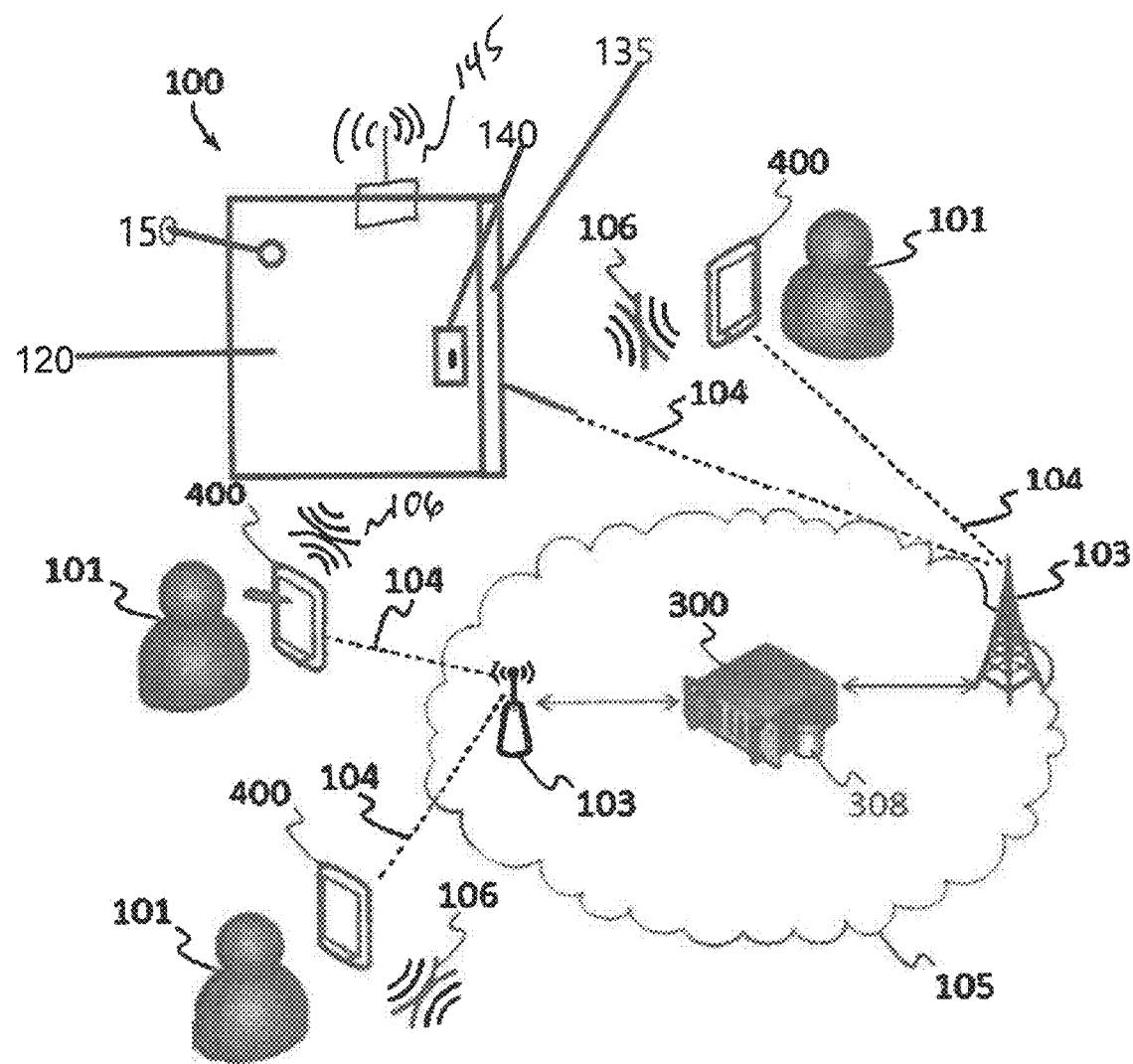
FIG. 1 depicts an illustrative example of some of the components and computer implemented methods which may be found in a system for deliveries according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "electronic device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smartwatches, Fitbit, other wearable fitness trackers, Google Glasses, and the like.

The term "client device" or sometimes "electronic device" or just "device" as used herein is a type of computer or computing device generally operated by a person or user of the system. In some embodiments, a client device is a smartphone or computer configured to receive and transmit data to a server or other electronic device which may be operated locally or in the cloud. Non-limiting examples of client devices include: personal computers (PCs), workstations, laptops, tablet PCs including the iPad, cell phones including iOS phones made by Apple Inc., Android OS phones, Microsoft OS phones, Blackberry phones, or generally any electronic device capable of running computer software and displaying information to a user. Certain types of client devices which are portable and easily carried by a person from one location to another may sometimes be referred to as a "mobile device" or "portable device". Some non-limiting examples of mobile devices include: cell phones, smartphones, tablet computers, laptop computers, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data, Non-limiting examples of data networks may include the internet or wireless networks or (i.e. a "wireless network") which may include Wi-Fi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented system and methods for access and management to a secure temperature-controlled enclosure are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIG. 1 depicts an illustrative example of a system 100 for gaining access to a secure lockable enclosure 120 useable for item pickup and/or deliveries according to various embodiments described herein is presented. The system 100 is configured to facilitate the transfer of data and information between one or more access points 103, control systems of the secure lockable enclosure ("secure enclosure") 120, client devices 400, and servers 300 over a data network 105. Each client device 400 and optionally each secure enclosure 120 may send data to and receive data from the data network 105 through a network connection 104 with an access point 103.

A data store 308 accessible by the server 300 may contain one or more databases. The data may comprise any information pertinent to one or more users 101 input into the system 100 including information on or describing one or more users 101, information requested by one or more users 101, information supplied by one or more users 101, financial and financial account information, information on one or more delivery addresses, enclosure location, delivery status, temperature requirements, courier pick up information, delivery map routing, delivery assignment or general order information the delivery courier or lockable enclosure owner is otherwise associated with, courier background, review ratings, licensing or other government regulation compliance information, and/or any other information which may describe a user 101 or be pertinent to the delivery or retrieval of items of the lockable enclosure. As used herein, the user 101 is an individual or business for picking up and/or delivering an item from and/or to the secure enclosure 120.

In this example, the system 100 comprises at least one client device 400 configured to be operated by one or more users 101. Client devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (LAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. Additionally, the system 100 may comprise one or more secure enclosure 120 which may be configured to control access for delivery or retrieval of objects. The present invention may be implemented on at least one secure enclosure 120, client device 400, and/or server 300 programmed to perform one or more of the steps described herein. In some embodiments, more than one secure enclosure 120, client device 400, and/or server 300 may be used, with each being programmed to carry out one or more steps of a method or process described herein.

In some embodiments, the system 100 may be configured to facilitate the communication of information between one or more secure lockable enclosure 120 and users 101, through their respective client devices 400, and servers 300 of the system 100. Electronic communication 106 between a client device 400 and a secure enclosure 120 may comprise wireless and/or wired communication. Users of the system 100 may include one or more delivery drivers, delivery couriers, the owner of the enclosure and any person assigned by the owner of the enclosure. In some embodiments, the secure enclosure 120 may be configured to contain food or delivery items in the compartment 50 (shown in FIG. 6 described below).

Using their client device 400 and a secure enclosure 120, a user or courier 101 may send and receive information with the system 100 that may be used to gain access to the contents of the secure enclosure 120. Once the contents have been placed or retrieved from the secure enclosure 120, the user or courier may retrieve the contents within. Optionally, the secure enclosure 120 may record and provide to the system 100 information describing events or actions of the user 101 regarding her/his accessing of the secure enclosure 120 and/or after the user 101 has accessed the enclosure.

FIG. 1 further depicts the secure enclosure 120 having an exemplary access door 135 with a remotely-controllable electronic lock device 140, which may include a network interface 145 for communicating with the server 300 over the data network 105 via an associated network connection 104. Suitable enclosures for the secure enclosure 120 include, but are not limited to, lockable enclosures or structures, shipping containers, trunks, boxes, lockers (e.g., medicine or police evidence lockers), fenced-in area or other structure, automobile enclosures such as external accessible enclosures, e.g., passenger compartments, trunks and lockable receptacles, and internal accessible enclosures such as glove boxes and console bins. Suitable lock devices for the remotely-controllable electronic lock device 140 include devices built into the enclosures 120 or separable from the enclosures 120 such, for example, a remotely-controllable padlock device.

The sensor 150 may be an image capture device, such as a camera, that encodes characteristic information, such as images and videos, for providing to the server 300, and/or for storing such information for later reproduction. Suitable cameras useable for the sensor 150 include those cameras described with regard to camera 31 in FIG. 5.

In addition, the sensor 150 may be configured to detect or sense information indicative of the user 101 including, motion sensor, a fingerprint scanner, or biotelemetry sensor, or other detector including, for example, code detectors for reading, for example, bar codes, quick response (QR) codes, or other identification codes. Other suitable detectors useable for the sensor 150 include detectors for detecting if a NFC tag, card, key fob, or the like is in proximity to the remotely-controllable electronic lock device 140. Optionally, one or more sensors 150 may be integrally formed with the remotely-controllable electronic lock device 140 or in remote wired or wireless communication with the remotely-controllable electronic lock device 140.

The remotely-controllable electronic lock device 140 may enable the access door 135 of the enclosure 120 to be locked and unlocked by, for example, electronic, magnetic or electro-magnetic means. As used herein, the remotely-controllable electronic door lock device refers to any remotely-controlled device or system that enables or inhibits access via an associated door to a structure or secure area including, for example, electro-mechanical and electro magnetic systems for garage doors, hinged doors, roll-top, sliding doors and rotating doors.

A lock control system (not shown) may be associated, for example, with an electronic lock manufacturer or a central control system for remotely-controllable electronic lock devices, such as the remotely-controllable electronic lock device 140 including, for example, automated remotely-operable garage door openers. Suitable lock control systems useable for the remotely-controllable electronic lock device 140 include, but are not limited to, cloud servers that control door lock devices such as, for example, Google Cloud IoT, AWS IoT, GE Predix, Microsoft Azure IoT, IBM Watson IoT, Samsung SmartThings, Wink, and Insteon. As used herein, a "cloud server" is a computer server that is built, hosted and delivered through a cloud computing platform over the Internet. Cloud servers possess and exhibit similar capabilities and functionality to a typical server but are accessed remotely. Servers connected to network hubs such as, for example, Amazon Alexa-enabled devices, Google Home-enabled devices and Samsung Smartthing hub, may also be used for the remotely-controllable electronic lock device 140. The lock control system may be disposed or located remotely or proximate the remotely-controllable electronic look device 140.

It should be readily understood that the lock control system may alternative communicate with the remotely-controllable electronic lock device 140 that enables the locking or unlocking of the access door 135 depending upon the type of electronic lock employed with the access door 135. Further, the access door 135 is meant to include any lockable door of a enclosure including, for example, an entry door, trunk, enclosure, vehicle door, garage door and may be in the form of, for example, a hinged door, roll-top door, sliding door or rotating door.

Figure 6:
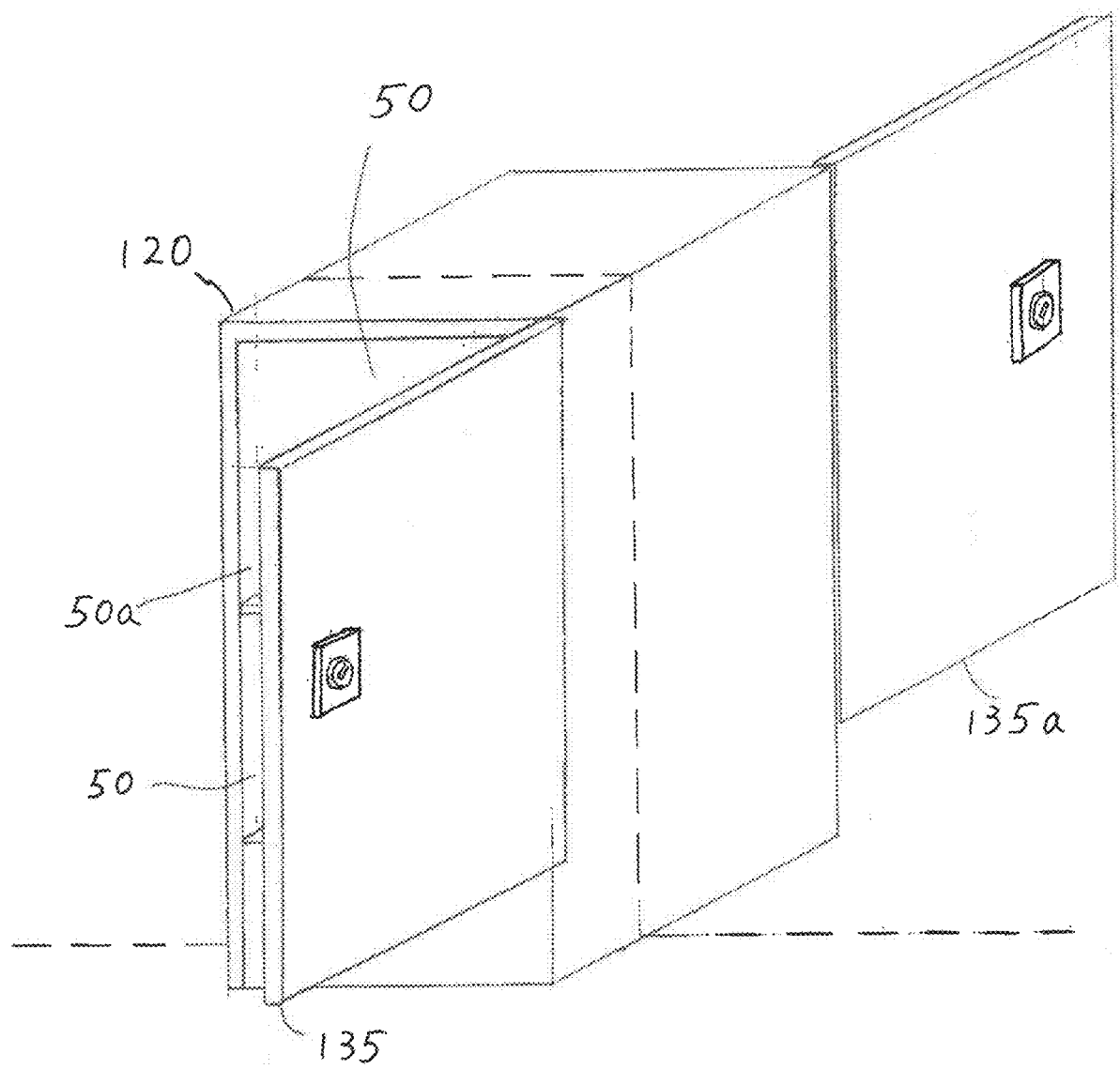
FIG. 6 depicts an exemplary embodiment of the secure lockable enclosure depicted in FIG. 1.

In some embodiments, the secure enclosure 120 may be secured within a building wall with access to both sides of the enclosure by, for example, respective separate access doors. FIG. 6 depicts such an embodiment of the secure enclosure 120 with the access door 135 and an optional second access door 135a located on opposite sides of the secure enclosure 120, depicted in open positions. In the embodiment of the secure enclosure in FIG. 6 includes two compartments indicated by reference numerals 50 and 50a. The secure enclosure 120 further includes at least one of the access doors 135 and 135a being lockable, to provide or prevent access to the compartment 50 and/or 50a.

Figure 2:
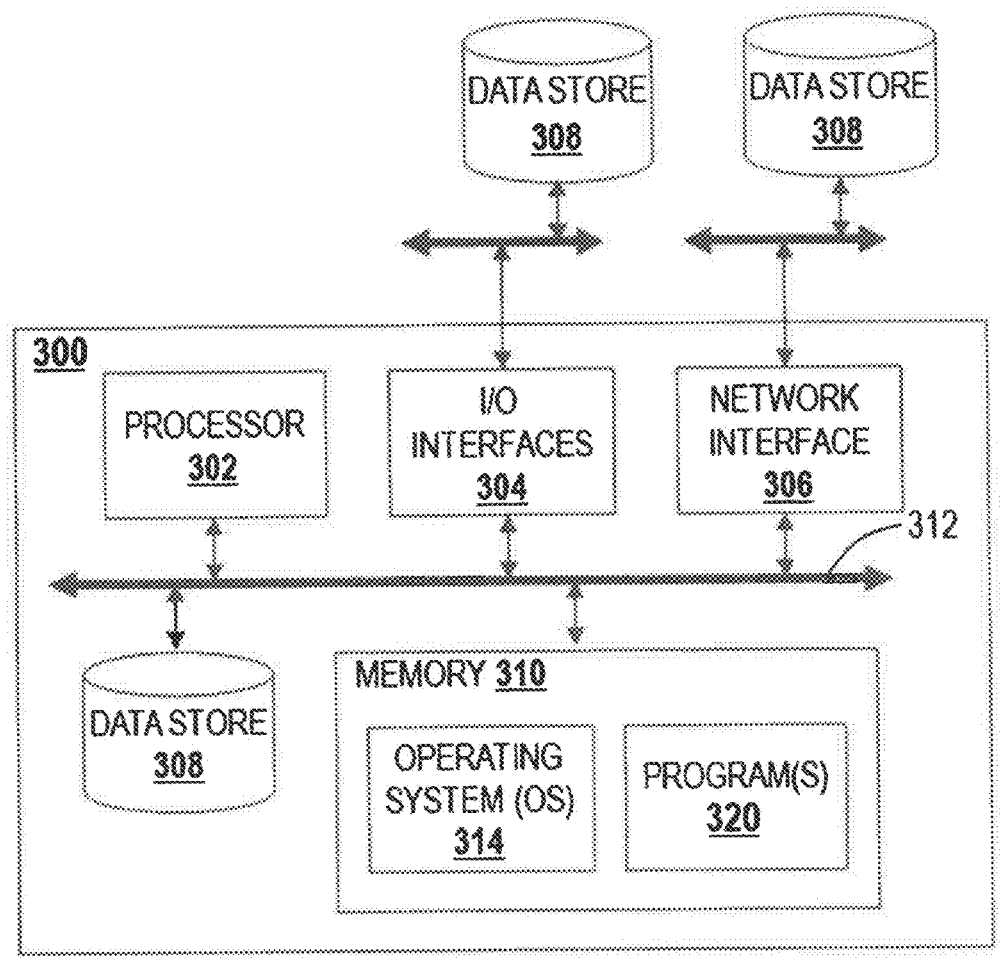
FIG. 2 illustrates a block diagram of an exemplary computer server useable by the system as described in various embodiments herein.

Referring now to FIG. 2, in an exemplary embodiment, a block diagram illustrates a server 300 of which one or more may be used in the system 100 or standalone. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The 110 interfaces 304 may be used to receive user input from and/or for providing system output to one or more devices or components. User input may be provided via, for example, a keyboard, touch pad, and/or a mouse. System output may be provided via a display device and a printer (not shown), I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/big/in). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the i/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (WS) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 320 may be configured to implement the various processes, algorithms, methods, techniques, etc. described herein.

Figure 3:
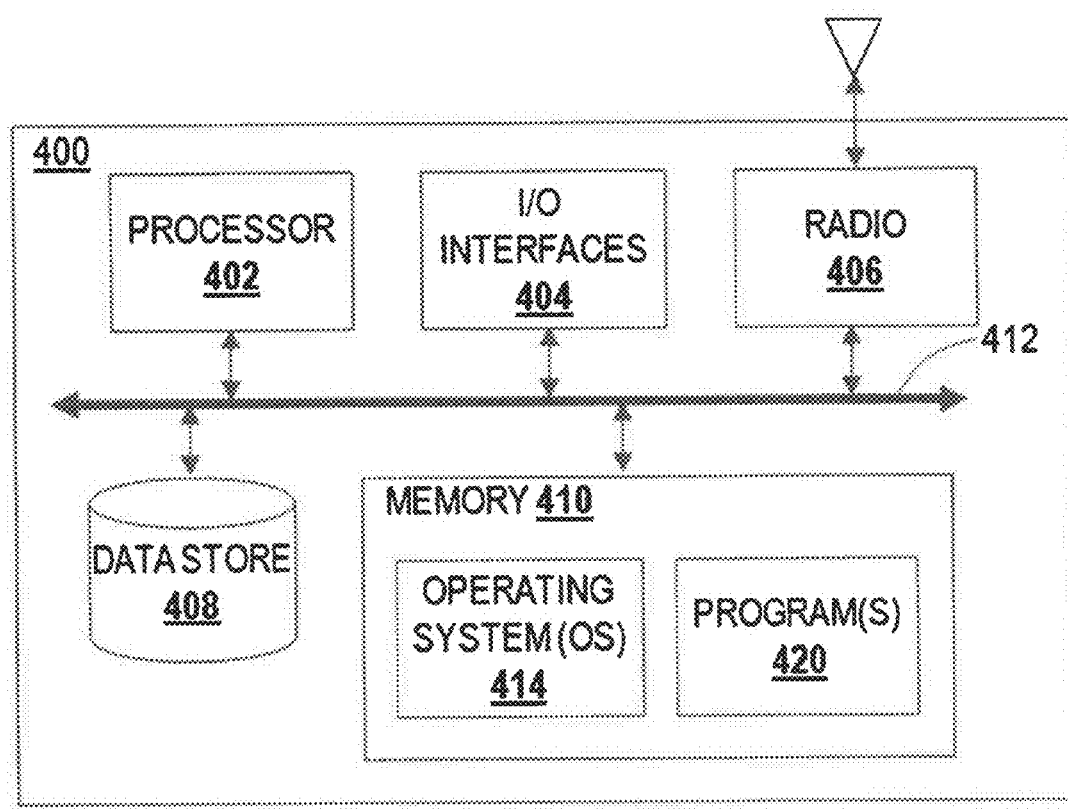
FIG. 3 illustrates a block diagram illustrating an example of a client device Which may be used by the system as described in various embodiments herein.

Referring to FIG. 3, in an exemplary embodiment, a block diagram illustrates a client device 400 of which one or more may be used in the system 100 or the like. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device fur executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display device such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G/5G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB;

and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like. The programs 420 may include various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Figure 4:
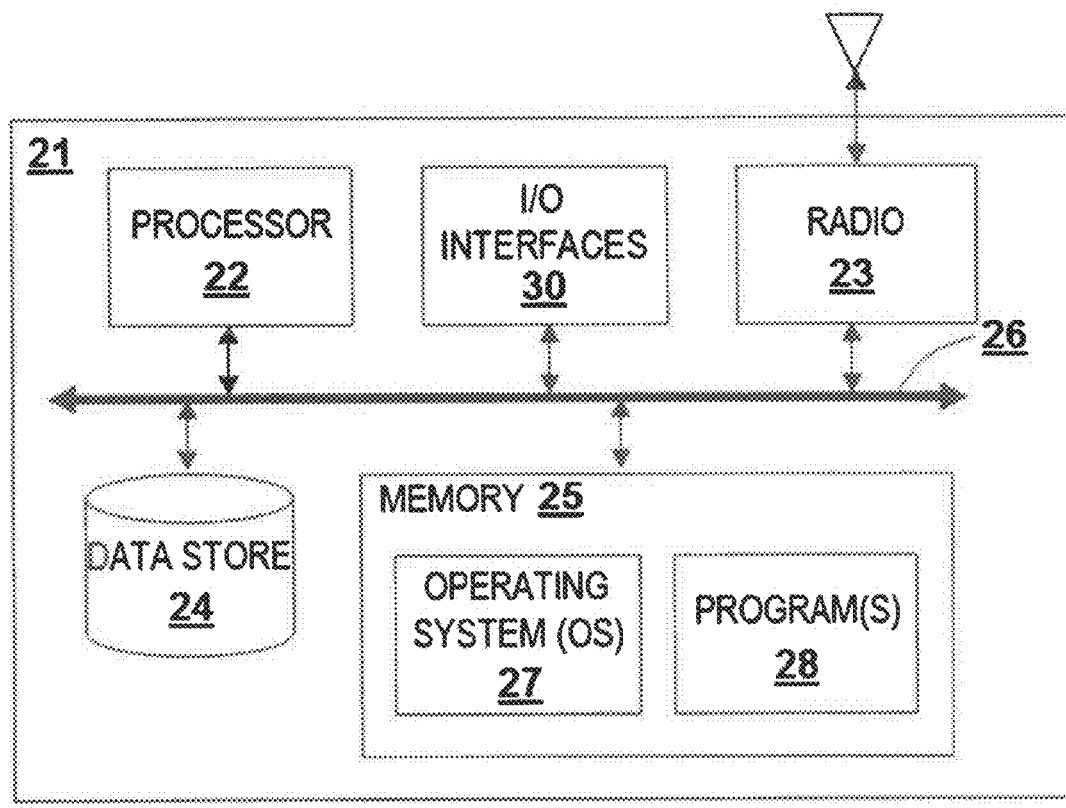
FIG. 4 depicts a block diagram of an exemplary processing unit of a secure lockable enclosure useable by the system as described in various embodiments herein.
Figure 5:
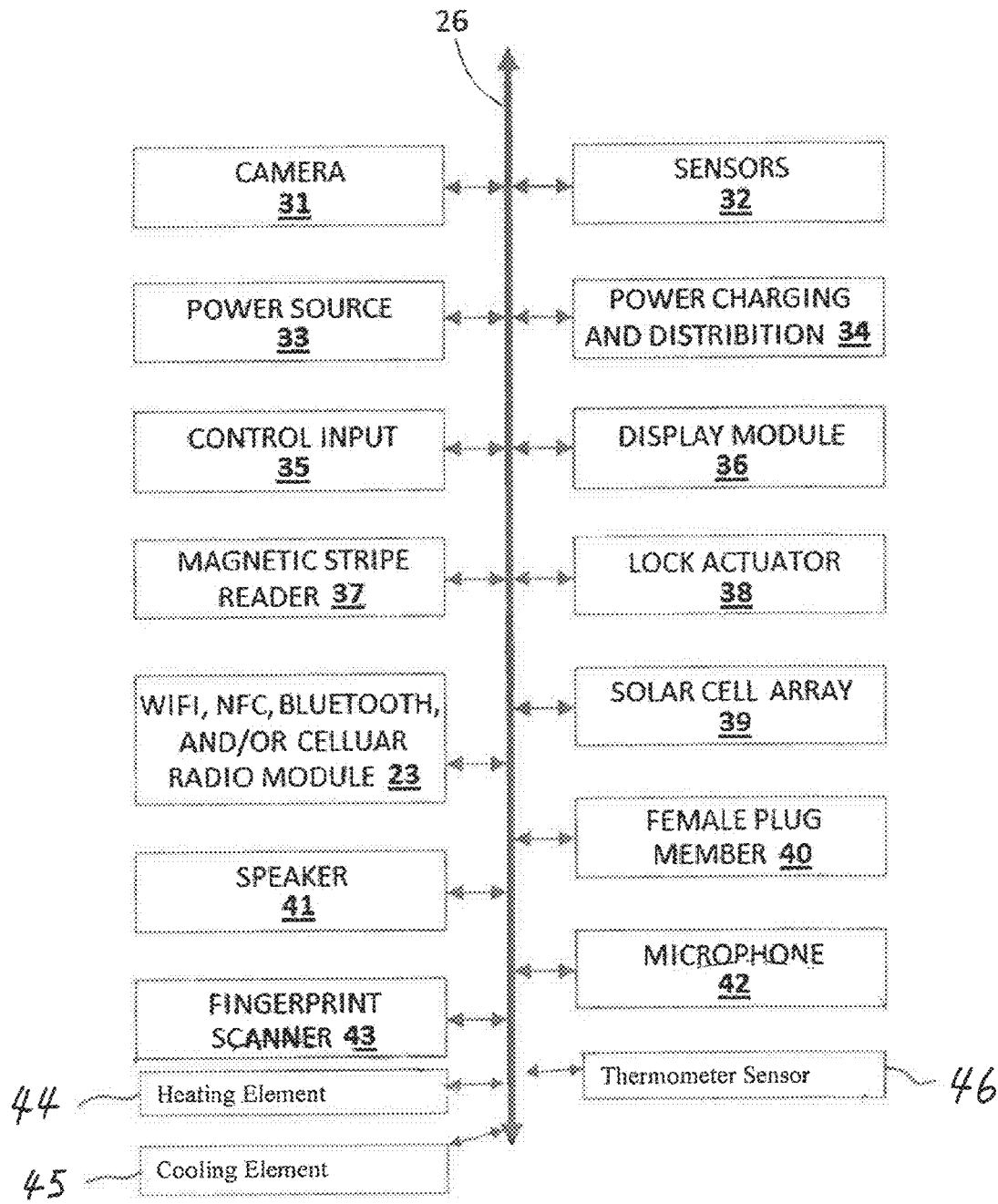
FIG. 5 illustrates a block diagram of an exemplary components useable with the processing unit of FIG. 4.

FIGS. 4 and 5 depict exemplary components useable in or with the secure enclosure 120 of the system 100 as described in various embodiments herein. In some embodiments and in the present example, a secure enclosure 120 can be a digital device that, in terms of hardware architecture, comprises a processing unit 21 coupled to other electronic components via a local communication interface 26. As shown in FIG. 4, the processing unit 21 may include a processor 22, one or more input/output (I/O) interfaces 30, an optional radio 23, a data store 24, and memory 25. It should be appreciated by those of ordinary skill in the art that FIGS. 4 and 5 depicts an example of a secure enclosure 120 in an oversimplified manner, and a practical embodiment may include additional components or elements and suitably configured processing logic to support known or conventional operating features that are not described in detail herein.

The components and elements (22, 30, 23, 24, and 25) are communicatively coupled via a local interface 26. Likewise, the components 31 through 46 depicted in FIG. 5 are likewise in electrical communication with, for example, the processor 22, via the local interface 26. The local interface 26 can be, for example but not limited to, one or more circuit boards, buses, or other wired or wireless connections, as is known in the art. The local interface 26 can have additional elements, which are omitted for simplicity, such as controllers, buffers (caches), drivers, repeaters, and receivers, among many others, to enable communications. Further, the local interface 26 may include address, control, and/or data connections to enable appropriate communications among the aforementioned components.

Referring to FIG. 4, the processor 22 is a hardware device for executing software instructions. The processor 22 can be any custom made or commercially available processor, a central processing unit (CPU), an auxiliary processor among several processors associated with the processing unit 21, a semiconductor-based microprocessor (in the form of a microchip or chip set), or generally any device for executing software instructions. When the processing unit 21 is in operation, the processor 22 is configured to execute software stored within the memory 25, to communicate data to and from the memory 25, and to generally control operations of the secure lockable enclosure 120 pursuant to the software instructions. In an exemplary embodiment, the processor 22 may include a mobile optimized processor such as optimized for power consumption and mobile applications. The I/O interfaces 30 can be used to output information to a user 101 and to receive user input. Additionally, an I/O interface 30 may comprise a servo, actuator, or other access controlling device which may be used to open and close a compartment in the secure lockable enclosure 120 which may be used to contain delivery or food items.

The I/O interfaces 30 can also include, for example, a serial port, a parallel port, a small computer system interface (SCSI), an infrared (IR) interface, a radio frequency (RF) interface, a universal serial bus (USB) interface, and the like.

One or more radios 23 may enable wireless communication to an external access device, such as a client device 400, or network 105. In some embodiments, a radio 23 may operate on a cellular band and may communicate with or receive a Subscriber Identity Module (SIM) card or other wireless network identifier. Any number of suitable wireless data communication protocols, techniques, or methodologies can be supported by one or more radios 23, including, without limitation: RF; IrDA (infrared); Bluetooth; ZigBee (and other variants of the IEEE 802.15 protocol); IEEE 802.11 (Wi-Fi or any variation); IEEE 802.16 (WiMAX or any other variation); Direct Sequence Spread Spectrum; Near-Field Communication (NEC); Frequency Hopping Spread Spectrum; Long Term Evolution (LTE); cellular/wireless/cordless telecommunication protocols (e.g. 3G/4G/5G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 24 may be used to store data. The data store 24 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 24 may incorporate electronic, magnetic, optical, and/or other types of storage media.

The memory 25 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 25 may incorporate electronic, magnetic, optical, and/or other types of storage media. Note that the memory 25 may have a distributed architecture, where various components are situated remotely from one another, but can be accessed by the processor 22. The software in memory 25 can include one or more software programs, each of which includes an ordered listing of executable instructions for implementing logical functions. In the example of FIG. 4, the software in the memory system 25 includes a suitable operating system (O/S) 27 and programs 28. The operating system 27 essentially controls the execution of input/output interface 30 functions, and provides scheduling, input-output control, file and data management, memory management, and communication control and related services. The operating system 27 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like. The programs 28 may include various applications, add-ons, etc. configured to provide end user functionality with the apparatus 100. For example, exemplary programs 28 may include, but not limited to, a communication application, a verification application, and/or a sensor application.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The processing unit 21 may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by the processor 22. In addition, the main memory may be used for storing temporary variables or other intermediate information during the execution of instructions by the processor 22. The processing unit 21 may further include a read only memory (ROM) or other static storage device (e.g., programmable ROM (PROM), erasable PROM (EPROM), and electrically erasable PROM (EEPROM)) coupled to the bus for storing static information and instructions for the processor 22.

In some embodiments as depicted in FIG. 5, a secure lockable enclosure 120 may comprise one or more cameras 31 which may be configured to provide to the server 300, or record, still or video images of the environment around the secure lockable enclosure 120 and preferably of a user 101 that is interacting with the secure lockable enclosure 120. In preferred embodiments, a camera 31 may comprise a digital camera that encodes images and videos digitally on a charge-coupled device (CCD) image sensor or on a complementary metal-oxide-semiconductor (CMOS) image sensor for providing to the server 300, and/or for storing images for later reproduction. In other embodiments, a camera 31 may comprise any type of camera which includes an optical system, typically using a lens with a variable diaphragm to focus light onto an image pickup device or image sensor.

As further depicted in FIG. 5, a secure lockable enclosure 120 may comprise one or more sensors 32 which may be configured to provide and record information describing the secure enclosure 120 and/or describing the real estate property, address, or improvement that a lockable enclosure is stationed at. In further embodiments, a sensor 32 may comprise a door lock sensor which may be configured to provide information to the secure lockable enclosure 120 indicating if a door is locked or unlocked and/or open or closed. In further embodiments, a sensor 32 may comprise a sensor configured to provide information to the secure enclosure 120 describing if a magnetic card has been inserted or is present in a magnetic stripe reader 37. In further embodiments, a sensor 32 may comprise a sensor configured to detect information indicative of the user 101 including, for example, a fingerprint scanner 43, or biotelemetry sensor, motion sensor, or other detector including, for example, code detectors for reading, for example, bar codes or quick response codes. Other suitable detectors useable for the sensor 32 include detectors for detecting if a NFC tag, card, key fob, or the like is in proximity to the secure enclosure 120. Optionally, one or more sensors 32 may be integrally formed with the secure enclosure 120 or in remote wired or wireless communication with the secure enclosure 120. In yet further embodiments, the sensor 32 may comprise a sensor or sensors configured to determine the presence or absence of contents within the compartment 50. Such sensors may include, for example, electrical, optical, magnetic or electro-mechanical sensors.

The secure lockable enclosure 120 may further comprise a power source 33 which may provide electrical power to any component of a secure enclosure 120 that may require electrical power. A power source 33 may comprise a battery, such as a lithium ion battery, nickel cadmium battery, alkaline battery, or any other suitable type of battery, a fuel cell, a capacitor, or any other type of energy storing and/or electricity releasing device. In further embodiments, a power source 33 may comprise a power cord, kinetic or piezo electric battery charging device, a solar cell or photovoltaic cell, and/or inductive charging or wireless power receiver. In further embodiments, a secure lockable enclosure 120 may also comprise a power charging and distribution module 34 which may be configured to control the recharging of the power source 33, discharging of the power source 33, and/or distribution of power to one or more components of a secure enclosure 120 that may require electrical power.

The secure enclosure 120 may additionally comprise one or more control inputs 35, which may be configured to accept user 101 input to allow a user 101 to interact with the secure lockable enclosure 120. Suitable devices for control input 35 may comprise, for example, a key pad, such as a twelve key keypad, touch sensor display screens or devices, or turntable control knobs, depressible button type switches, slide type switches, rocker type switches, or any other suitable input that a user 101 may physically interact with to control a function of the secure lockable enclosure 120.

In some embodiments, a secure lockable enclosure 120 may comprise one or more display modules 36 which may be configured to output and display visual information to a user 101. In further embodiments, a display module 36 may comprise a Liquid crystal display (LCD), Light-emitting diode display (LED), Electroluminescent display (ELD), Electronic paper, E Ink, Plasma display panel (PDP), Cathode ray tube display (CRT), High-Performance Addressing display (HPA), Thin-film transistor display (TFT), Organic light-emitting diode display (OLED), Surface-conduction electron-emitter display (SED), Laser TV, Carbon nanotubes, Quantum dot display, and/or interferometric modulator display (IMOD).

In some embodiments, a secure lockable enclosure 120 may comprise a magnetic stripe reader 37, also called a magstripe reader, which may be a hardware device that reads information encoded in a magnetic stripe located on card, badge, or the like. In further embodiments, a magnetic stripe reader 37 may be an insertion-type reader which requires that the badge or card be inserted into the reader and then pulled out. In still further embodiments, a magnetic stripe reader 37 may be swipe-type reader which requires that the badge or card pass completely through the reader. In other embodiments, a magnetic stripe reader 37 may be any other type or style of reader which may be able to record or receive magnetically encoded information from an object such as a card, badge, or the like.

The secure enclosure 120 may further be configured to manage internal temperatures of the cavity within the enclosures with an environmental controller such as, for example, heating elements 44 and/or cooling elements 45. Suitable heating elements 44 for the secure enclosure 120 may include, for example, heat coils, composite heating elements, Positive Temperature Coefficient "PTC" heating elements and Peltier heat pumps. Suitable cooling elements 45 for the secure enclosure 120 may include, for example, thermal electric cooling system such as Peltier devices, solid state refrigerators, or thermoelectric coolers (TEC). The processing unit may rely on temperature information from thermometer sensor 46 for operating and/or controlling the heating element 44 and/or cooling element 45. Further, the secure enclosure may also include some level of insulation.

The secure enclosure 120 may comprise one or more compartments 50 (FIG. 1), such as a cavity, receptacle, or the like, which may be configured to receive perishable and/or non-perishable items. The compartment 50 (as depicted in FIG. 6) may be accessible via access door 135 (FIG. 1) or other access controlling portal and also comprise an electronic lock actuator 38, which may be configured to control the locking and/or unlocking of the access door 135 (FIG. 1) to the compartment 50. The lock actuator 38 may be operable by a source of energy, typically electric current, hydraulic fluid pressure, or pneumatic pressure, and which converts that energy into motion for the purposes of locking and unlocking the door 135 or other access controlling portal of the compartment 50. Examples of lock actuators 38 may include comb drives, digital micro-mirror devices, solenoids, electric motors, electroactive polymers, hydraulic cylinders, piezoelectric actuators, pneumatic actuators, servomechanisms, thermal bimorphs, screw jacks, or any other type of hydraulic, pneumatic, electric, mechanical, thermal, and magnetic type of actuators, to cause an unlock of a latching mechanism for the access door 135 or to move such door 135 from a closed and locked position to an open position, and vice-a-versa.

Referring again to FIG. 5, the secure enclosure 120 may comprise a communications port such as a receptacle, for example, female plug member 40 which may be configured to receive and electrically communicate with a male plug member. The female plug member 40 may allow data to be imported and exported from the data store 24 (FIG. 4) of the secure lockable enclosure 120. Optionally, a female plug member 40 may be configured to receive power and to communicate the power to a power source 33, power charging and distribution 34 module, and/or to any other electrical component of a secure lockable enclosure 120. The female plug member 40 may comprise, for example, a female USB connector such as a female micro-USB connector or female mini-USB connector. In other embodiments, an female plug member 40 may comprise a female Type A USB connector, a female Type B USB connector, a female Mini-A USB connector, a female Mini-B USB connector, a female Micro-A USB connector, a female Micro-B USB connector, a female Micro-B USB 3.0 connector, a female ExtMicro USB connector, a female Lightning connector, a female 30-pin dock connector, a female Pop-Port connector, a female Thunderbolt connector, a female Firewire connector, a female Portable Digital Media Interface (PDMI) connector, a female coaxial power connector, a female barrel connector, a female concentric barrel connector, a female tip connector, or any other plug, connector, or receptacle capable of electrical communication with an electronic device.

The secure enclosure 120 may further comprise one or more speakers 41, which may be used to produce a plurality of sounds, and one or more microphones 41, which may be configured to pick up or record audio information from the environment of the secure enclosure 120. The speaker 41 may comprise, for example, a buzzer, a piezoelectric sound producing device, a dielectric elastomer sound producing device, a buzzer, a moving coil loudspeaker, an electrostatic loudspeaker, an isodynamic loudspeaker, a piezoelectric loudspeaker, or any other device capable of producing one or more sounds. The microphone 41 may comprise any acoustic-to-electric transducer or sensor that converts sound in air into an electrical signal including, for example, electromagnetic induction microphones (dynamic microphones), capacitance change microphones (condenser microphones), and piezoelectricity microphones (piezoelectric microphones) to produce an electrical signal from air pressure variations.

The secure lockable enclosure 120 may also comprise one or more fingerprint scanners 43 useable to capture a digital image of the fingerprint pattern or other characteristic or otherwise generate a signal indicative of the fingerprint. The captured image may be referred to as a live scan. This live scan may be digitally processed to create a biometric template (a collection of extracted features) which is stored and used for matching. In further embodiments, a fingerprint. scanner 43 may operate with technologies including optical, capacitive, radio frequency (RF), thermal, piezoresistive, ultrasonic, piezoelectric, microelectromechanical systems (MEMS), or any other suitable fingerprint reading technology.

Referring to FIGS. 1 and 2, the server 300 may be configured to execute the programs 320 of applications or software rules engines including for example, of a communication application, verification application, and/or sensor application to control the granting and/or denying of access to the compartment 50 of the secure enclosure 120 by an individual. Additionally, data may be sent and received to and from one or more client devices 400 (FIGS. 1 and 3) and secure lockable enclosure 120 (FIGS. 1, 4, and 5) Which may be in wired and/or wireless electronic communication with a server 300 through a network 105. In other embodiments, the communication application, verification application, and/or sensor application may be configured to executed by the processing or control units of the secure enclosure 120, client device 400, and/or the server 300 with data transferred to and from one or more servers 300 in communication with a data store 308 through a network 105. In further embodiments, a completion database may be stored on a data store 408 of a client device 400. A delivery database may comprise any data and information pertinent to one or more users 101 input into the system 100. This data may include user information which may comprise information on or describing one or more users 101. For example, stored user information may include user 101 information such as address or contact information, a photograph or picture of the user 101, fingerprint or other biotelemetry information, financial and financial account information, information on one or more delivery addresses, enclosure location, delivery status, temperature requirements, courier pick up information, enclosure location, delivery map routing, delivery assignment or general order information the delivery courier or lockable enclosure owner is otherwise associated with, courier background, review ratings, licensing or other government regulation compliance information, and/or any other information which may describe a user 101 or be pertinent to the delivery or retrieval of items of the lockable enclosure.

The communication application may comprise a computer program which may be executed by a computing device processor, such as a processors 22, 302 or 402, and which may be configured to govern electronic communication between secure enclosure 120, servers 300, and client devices 400. In some embodiments, the communication application 121 may govern the electronic communication by initiating, maintaining, reestablishing, and terminating electronic communication between one or more secure lockable enclosure 120, servers 300, and client devices 400.

In further embodiments, the communication application may control the network interface 306 of a server 300, radio 23 of a secure lockable enclosure 120, and/or radio 406 of a client device 400 to send and receive data to and from one or more client secure enclosure 120. servers 300, and client devices 400 through a network connection 104 (FIG. 1) over a network 105 (FIG. 1). Additionally, the communication application may be configured to store, retrieve, modify, delete, create, or otherwise interact with data in the delivery database 107.

The verification application may comprise a computer program which may be executed by a computing device processor, such as a processors 22, 302, and/or a processor 402, and which may be configured to compare data received from the communication application to data received from the verification application. In some embodiments, the verification application may compare the client input received through the client device 400 of the user 101, such as a photograph of the user taken by a camera I/O interface 404 of a client device 400 and/or a photograph of the user taken by a camera 31 of a secure enclosure 120, to data retrieved by the communication application from the delivery database. In further embodiments, the verification application may compare the client input received through a secure enclosure 120, such as from a camera 31, sensor 32, control input 35, or magnetic stripe reader 37, from the user 101 to data retrieved by the communication application from the delivery database 107. The verification. application may be configured to determine if data provided by the secure lockable enclosure 120 and/or client device 400 of a user 101 matches data, preferably data associated with the user 101 and/or with the property or improvement that the secure lockable enclosure is stationed at, retrieved from the delivery database.

The sensor application may comprise a computer program which may be executed by a computing device processor, such as processors 22, 302, and/or 402, and which may be configured to provide data from one or more sensors 32, such as a door lock sensor, a magnetic card detection sensor, or a NEC tag, card, key fob, sensor to the communication application and/or verification application, Additionally, the sensor application may be configured to provide data from a camera 31, control input 35, magnetic stripe reader 37, and female plug member 40 to the communication application and/or verification application. In further embodiments, the sensor application may be configured control data and power to a display module 36 and lock actuator 38 using data provided by the communication application and/or verification application.

Figure 7:
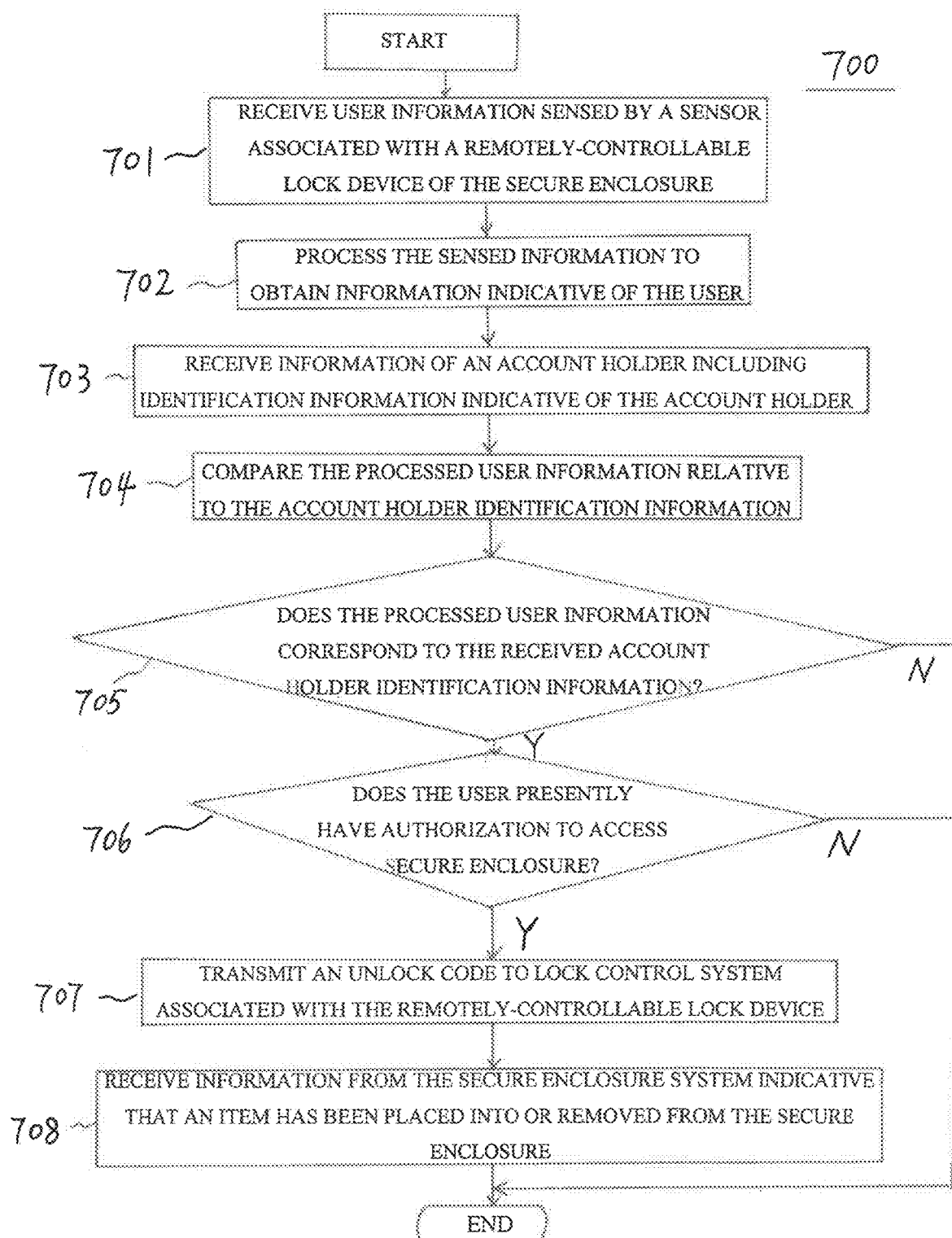
FIG. 7 is a flow diagram of an exemplary computer-implemented method for gaining access to a compartment of the secure enclosure according to an embodiment of this disclosure.

FIG. 7 illustrates a flow diagram of an exemplary computer-implemented method 700 for controlling access to the compartment 50 of the secure enclosure 120 to allow a user 101 to deliver or retrieve items stored in the compartment 50. One or more steps of the method 700 may be performed by the software programs for the communication application, verification application, and/or sensor application.

In step 701 of the method 700, identification information indicative of the user 101 is received from a sensor associated with the secure enclosure 120. In some embodiments, a user 101 may provide identification information to the secure enclosure 120 by allowing, for example, the camera 31 to capture a image characteristic of the user 101, e.g., face, or the fingerprint sensor 43 to obtain fingerprint information of the user 101. The sensed information is then processed to obtain information indicative of the user 101 in step 702.

In step 703, information is retrieved of an account holder based on either the identification information obtained in step 702, or some other information identifying which particular account holder the user 101 purports to be, or from which group of account holders the user 101 purports to belong. In other embodiments, a user 101 may provide identification information for access to the secure enclosure 120 by providing input through a control input 35, such as a keypad, by having images of bar codes or quick response (QR) codes, or other identification codes, or by swiping a card, badge, credit card, identification card, or the like, having a magnetic information stripe through a magnetic stripe reader 37. In still further embodiments, a user 101 may provide identification information for access to the secure lockable enclosure 120 by communicating identification information through a female (or male) plug member 40 and/or wireless transmissions through a radio 23, such as with Wi-Fi, Bluetooth, NFC, and cellular communication protocols using their client device 400, Near Field Communication (NFC) keyfobs, tags, or the like.

In step 704, the user identification information and the account holder identification are compared by, for example, the verification application. In some embodiments, the verification application may compare an image of the user 101 taken by the camera 31 against a photographic image of the account holder stored in the delivery database 107 using, for example, facial recognition software or technology. In other embodiments, the verification application may compare fingerprint information or the identification information provided through a control input 35, magnetic strip reader 37, or plug 40 to identification information of the account holder stored in the delivery database 107.

Next, in step 705, the method 700 determines whether the comparison performed in step 704 of the user identification information corresponds to, i.e., sufficiently matches, the account holder information. If it is determined that a correspondence exists, the method 700 proceeds to optional step 706. Otherwise, the method 700 ends with no unlock signal being transmitted for unlocking the lock 140 of the secure enclosure 120. In step 706, the method 700 determines whether the identified user has authorization to access the secure enclosure 120 at the time of such request. If the identified user has such authorization, the method 700 proceeds to step 707, otherwise the method 700 ends with no unlock code being transmitted for unlocking the lock 140 of the secure enclosure 120. It should be readily understood that step 706 may be an optional step according to the present disclosure.

In step 707, an unlock code for the secure enclosure 120 is sent to a lock control system for the remotely-controllable lock device 140 by, for example, the communication application for unlocking the lock device 140. The unlock code for the secure enclosure 120 may be additionally sent to the client device 400 of the user 101. The client device 400 may then communicate the unlock code to the lock control system for the remotely-controllable lock device 140, for comparison relative to the unlock code received by the lock control system from the controller 300, and for unlocking the lock device 140 if the comparison yields a match or correspondence. In an alternative embodiment, the user 100 may manually enter or otherwise the received unlock code on his client device 400 into the control input keypad 35, communications port 40, microphone 42, or by way of a sensor 32 or Wi-Fi, Bluetooth, NEC, or other wireless communication from the client device 400 to the lock control system, for comparison relative to the unlock code received by the lock control system from the controller 300.

After completion of step 707 and the user 101 has gained access to the compartment 50 to deliver or retrieve an item, the server 300 then, in step 708, receives from the secure enclosure 120 information indicative that such item has been placed into or retrieved from the enclosure. Although the steps of the method 700 are described as being performed by, for example, the server 300, the verification steps 804 and/or 805 may alternatively be performed by a processor within or associated with the secure lockable enclosure 120, such as the processor 22.

The method 700 may further include a step of, for example, the server 300 or processor 22 receiving information indicative of a characteristic of the at least one item placed in the secure enclosure 120. The characteristic information may comprise at least one of item type, or desired environmental temperature(s) specified for such delivered item, e.g., heating or cooling temperature of delivered food or perishables. Such characteristic information may be received by the server 300 from the sender of the item to be delivered, or received from the secure enclosure 120 based on information detected by an item sensor, e.g., one of the sensors 32, of the secure enclosure 120. Such item sensor may detect a code, such as a bar code or other code placed on the item and/or receipt or displayed on the client device 400 of the user 101.

The method 700 is particularly useful for the delivery and retrieval of food and other perishable items by an individual who may not be at the location of the secure enclosure 120 when such items are placed therein. in such an application of the method 700, the user 101 may be a delivery person selected to deliver food from, for example, a restaurant or a grocery store. Such deliver person may be employed by the restaurant or grocery store, or for from a delivery or ride-share service that is making deliveries on behalf of the restaurant or grocery store. Information of more than one delivery persons is gathered by the employer and provided to, for example, the server 300 for maintaining in the data store 308, so that any one of such delivery persons may be the user 101 for a particular delivery.

Figure 8:
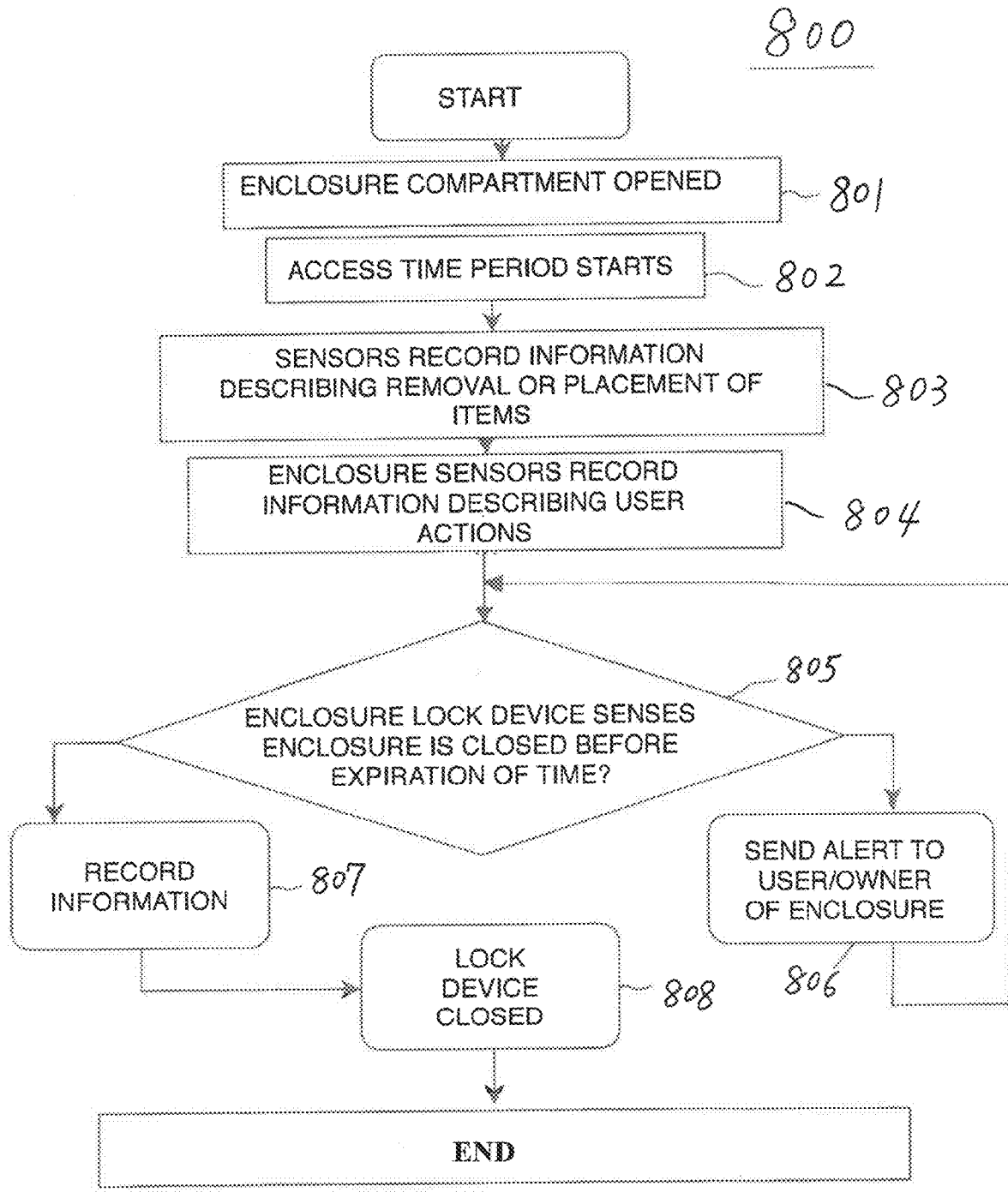
FIG. 8 is a flow diagram of an exemplary computer-implemented method for gaining access to a compartment of a secure enclosure according to another embodiment described herein.

FIG. 8 is a block diagram of an exemplary computer-implemented method 800 to allow access to an enclosure so that the user 101 may deliver or retrieve items to/from the secure enclosure 120 (FIG. 1, 4). One or more steps of the method 800 may be performed by the communication application, verification application, and/or sensor application, which may be executed by a computing device processor, such as the processor 22 (FIG. 4), processor 302 (FIG. 2), and/or processor 402 (FIG. 3).

In accordance with the method 800, in step 801, the door 135 of the secure enclosure 120 may be opened allowing the user 101 to access the compartment 50 for delivery or retrieve items using, for example, the method 700 of FIG. 7.

In step 802, a timer such as, for example, a countdown timer, is set to a predetermined permitted access time period and starts upon either the unlocking of the door 135 and/or the detection of the opening of such door. Such permitted time period may optionally be communicated to the user 101. The permitted access time period may comprise a length of time that the user 101 may have to complete the delivery or retrieval of items stored in the enclosure before the door 135 must be closed. In some embodiments, the communication application and/or sensor application may provide an enclosure access time period to the user 101 through a display module 36 or speaker 41 of a secure enclosure 120. In other embodiments, the communication application and/or sensor application may provide the access time period to the user 101 through a display screen or speaker of the client device 400 of the user 101.

In step 803, output information of one or more secure enclosure sensors 32 may be recorded regarding the placement or removal of items into/from the compartment 50, including, for example, detection that an item is placed or removed from the compartment 50 and the time of such detection. The sensor application may record the information and/or provide the information to the communication application. In some embodiments, the sensor 32 may, for example, comprise a radio-frequency identification (RFID) sensor which may interact with a RFID tag on the items to provide information describing removal of items from the compartment 50. In alternative embodiments, information describing removal of items from the compartment 50 may be provided by a radio 23 using Wi-Fi, Bluetooth, or NFC communication protocols which may allow the secure lockable enclosure 120 to track removal enclosed items.

In step 804, output information of one or more sensors 32 may be recorded regarding actions of the user 101. The sensor application may record the information and/or provide the information to the communication application. In some embodiments, a sensor 32 may comprise a door lock sensor which may be configured to provide information regarding whether a door is locked or unlocked and/or open or closed. In further embodiments, a sensor 32 may comprise a sensor configured to provide information regarding a magnetic card inserted into or swiped by the magnetic stripe reader 37.

In step 805, the method 800 determines whether the access door 135 is closed prior to the expiration of the timer exceeding the permitted access time period. If in step 805, the access door 135 is not closed before the expiration of the permitted access time period, the method 800 proceeds to step 806 and the sensor application may provide notification of such exceeded access time beyond the permitted access time to the communication application, which in turn may provide a corresponding alert to the user 101 and/or the owner or manager of the lockable enclosure 120. The communication application may store information concerning such confirmation in the delivery database 107, which may be accessed by the owner or manager of the lockable enclosure. Optionally the communication application may store this alert information in the data store 24 of the secure lockable enclosure 120 and/or in the delivery database 107. After step 806, the method 800 returns to step 805 to determine if the user 101 has responded to the alert or otherwise has closed the access door 135. The recording of the output signals of the sensors 32 of step 804 continues for steps 805 and 806.

However, if in step 805 it is determined that the access door 135 or the lock position of the electronic lock device 140 is returned to the lock position of the secure lockable enclosure 120 before the expiration of the permitted access time period, the method 800 proceeds to step 807 and the sensor application record information regarding the completion of the delivery or retrieval of items, such as date and time of access and sensor information, and provide the information to the communication application. The communication application may store this information in the delivery database 107 which may be accessed by a user 101 such as the owner or manager of the lockable enclosure. Optionally the communication application may store this information in the data store 24 of the secure lockable enclosure 120 and/or in the delivery database 107.

After performance of step 807, the method 800 proceeds to step 808 wherein the remotely-controllable door lock device 140 is set to its lock position, and the method 800 thereafter ends.

Principles of various embodiments of the computer-implements method for gaining access to a secure lockable enclosure in FIGS. 7 and 8 via a moveable element or door, may additionally be applied for gaining access to an enclosure or structure 120 having a door employing a remotely operated door lock device, such as the remotely-controllable door lock device 140 of the access door 135 of an enclosure or structure 130 of FIG. 1.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a hack end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or Wi-Fi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical electromagnetic or optical signals that carry digital data streams representing various types of information.

The network link typically provides data communication to the cloud, e.g., remote server, through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and Wi-Fi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

In addition to delivery and receipt of food and perishables to businesses or homes, other suitable applications for secure enclosures in accordance with this disclosure includes, for example, medicine lockers for hospitals, nursing homes, home care such as hospice care; package delivery by autonomous vehicles wherein the package is disposed in the trunk or other lockable enclosure of such vehicle; access to shipping containers by authorized personnel including inspectors and other government employees; evidence lockers for authorized police personnel; access to secure areas; and access to passenger compartments of rideshare vehicles or subscription service vehicles.

The invention claimed is:

1. A secure enclosure system comprising:
an enclosure housing having at least one compartment formed therein for receiving at least one item;
a moveable element engaging the secure enclosure housing to provide or prevent access to the at least one compartment;
an electronically-actuated latching mechanism coupled to the moveable element;
a network interface for providing communication with a communications network;
a user sensor for sensing a characteristic related to a user attempting to gain access to the compartment;
an item sensor configured to detect information indicative of a characteristic of the at least one item;
an environmental controller comprising at least one of heating or cooling source adapted to provide at least one of heating or cooling to the at least one compartment;
a processor coupled to the latching mechanism, the network interface, the user sensor, item sensor, and the environmental controller, wherein said processor is adapted to cause the network interface to transmit information indicative of a sensed characteristic related to the user attempting to gain access to the compartment and capable of processing an unlock signal to control the latching mechanism to provide access to the compartment by the user, and wherein said processor is adapted to control the environmental controller based on sensed information indicative of a characteristic of the at least one item placed in the at least one compartment;
wherein the sensed information indicative of the characteristic of the item placed in the at least one compartment is at least one of item type, or a desired environmental temperature(s) specified for such delivered item; and a compartment sensor coupled to the processor wherein the compartment sensor detects the presence or absence of an item within the compartment.

2. The secure enclosure system of claim 1 wherein said user sensor is an image capture device.

3. The secure enclosure system of claim 1 wherein said user sensor is a code reader.

4. The secure enclosure system of claim 3 wherein said code reader is a bar code reader.

5. The secure enclosure system of claim 1 wherein said processor is configured to receive the unlock signal from the communication network.

6. The secure enclosure system of claim 1 wherein said processor is configured to receive information from the network interface related to an account holder and generate the unlock signal based on at least a comparison of the received information relative to information indicative of the sensed characteristic related to the user attempting to gain access to the compartment.

7. The secure enclosure system of claim 1 wherein the electronically-actuated latching mechanism is a locking mechanism.

8. The secure enclosure system of claim 1 wherein the electronically-actuated latching mechanism comprises a motor for moving the movable element relative to the housing.

9. The secure enclosure system of claim 1 wherein said processor is disposed separate from the housing.

10. The secure enclosure system of claim 1 further comprising at least one of temperature sensor coupled to the processor.

11. The secure enclosure system of claim 1 further comprising a securing element coupled to the housing to enable attaching the housing to at least one of a floor, ground, wall, post, fence, platform or structure.

12. A computer implemented method for providing access to a secure enclosure comprising the steps of:

receiving information representing identification information of a user attempting to gain access to the secure enclosure sensed by a user sensor associated with a remotely-controllable electronic lock device of said secure enclosure;

processing the sensed information to obtain information indicative of the user;

receiving information of an account holder, said information including identification information indicative of the account holder;

verifying the processed user information relative to the account holder identification information;

transmitting an unlock code to a lock control system associated with the remotely-controllable electronic lock device if the verification step verifies that the processed user information corresponds to the received account holder identification information;

receiving a signal from the secure enclosure system indicative that said system detected that at least one of an item has been placed into, or removed from, the compartment of the secure enclosure after transmission of the unlock code;

receiving information indicative of a characteristic of the at least one item placed in the secure enclosure wherein the characteristic information is detected by an item sensor of the secure enclosure; and transmitting to the secure enclosure system environmental information based on the characteristic information, wherein the secure enclosure system is configured to set a temperature in the compartment based on the environmental information.

13. The computer-implemented method of claim 12 wherein the user sensor is an image sensor and the sensed identification information by the user sensor represents image information of the user's face.

14. The computer-implemented method of claim 13 wherein the verifying steps performs a facial recognition process based on the account holder identification information relative to processed image information of the user's face.

15. The computer-implemented method of claim 12 wherein the user sensor is a code reader and the sensed identification information by the user sensor represents an identification code.

16. The computer-implemented method of claim 15 wherein the identification code is bar code.

17. The computer-implemented method of claim 12 wherein the verification step and transmitting step are performed by the lock control system.

18. The method of claim 12 wherein the lock control system is located proximate the structure.

19. The method of claim 12 wherein the step of transmitting the unlock code to a lock control system associated with the remotely-controllable electronic lock device further comprises the step of transmitting a signal to a client device associated with the user, wherein the user's client device transmits a signal to a receiver of the remotely-controllable electronic lock device to cause such remotely-controllable electronic lock device to enable access.

20. The computer-implemented method of claim 12 wherein the characteristic information comprises at least one of item type, or specified item temperature.

21. The computer-implemented method of claim 12 wherein the characteristic information is indicative of heating or cooling said compartment.

22. The computer-implemented method of claim 12 wherein the characteristic information is received from a third party system.

23. The computer-implemented method of claim 12 wherein the characteristic information is based on a code detected by the item sensor.

24. The computer-implemented method of claim 12 further comprising the step of transmitting information concerning the placed item to a device of a person associated with the secure enclosure system.

25. The computer-implemented method of claim 12 wherein the verification step further comprises verifying that the user is authorized to gain access to the compartment for at least a time period in which the user is attempted to gain such access.

26. The computer-implemented method of claim 25 wherein the verification step further comprises determining whether notification information has been received that access to the secure enclosure will be attempted by the user during the time period.

27. The computer-implemented method of claim 26 wherein the step of determining whether notification information has been received further comprises determining if the user is one in a group of authorized users.

\* \* \* \* \*